(12) United States Patent
Mudge et al.

(10) Patent No.: US 8,346,832 B2
(45) Date of Patent: Jan. 1, 2013

(54) RANDOM NUMBER GENERATOR

(75) Inventors: Trevor Nigel Mudge, Ann Arbor, MI (US); David Theodore Blaauw, Ann Arbor, MI (US); Carlos Alfonso Tokunaga, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1430 days.

(21) Appl. No.: 11/826,996

(22) Filed: Jul. 19, 2007

(65) Prior Publication Data

US 2008/0091755 A1   Apr. 17, 2008

Related U.S. Application Data

(60) Provisional application No. 60/851,073, filed on Oct. 12, 2006.

(51) Int. Cl.
*G06F 1/02* (2006.01)
*G06F 7/58* (2006.01)

(52) U.S. Cl. ...................................... 708/250

(58) Field of Classification Search ........... 708/250–256
See application file for complete search history.

(56) References Cited

U.S. PATENT DOCUMENTS

| | | | | |
|---|---|---|---|---|
| 4,752,748 | A * | 6/1988 | Grzeszykowski | 331/1 A |
| 5,166,959 | A * | 11/1992 | Chu et al. | 377/20 |
| 5,826,061 | A * | 10/1998 | Walp | 716/108 |
| 6,771,104 | B2 * | 8/2004 | Hars | 327/164 |
| 6,795,837 | B1 * | 9/2004 | Wells | 708/3 |

(Continued)

FOREIGN PATENT DOCUMENTS

JP   2003-084970   3/2003

(Continued)

OTHER PUBLICATIONS

C Hoggins, C D'Alessandro, D Kinniment, A Yakovlev, Securing On-Chip Operations against Timing Attacks, Sep. 2005, University of Newcastle upon Tyne, pp. 1-8.*
S Walker, S Foo, Evaluating Metastability in Electronic Circuits for Random No. Generation, IEEE, 2001, pp. 99-101.*

(Continued)

*Primary Examiner* — Chuong D Ngo
*Assistant Examiner* — Kevin G Hughes
(74) *Attorney, Agent, or Firm* — Nixon & Vanderhye P.C.

(57) ABSTRACT

A circuit for generating a random output value is disclosed that comprises: a bistable circuit having two stable states in which a 0 or a 1 is output and having a balanced metastable state in which a floating value between 0 and 1 is output, said bistable circuit resolving from said metastable state to one of said stable states on being switched on, said state depending on a voltage level at a port on said bistable circuit; a voltage level control circuit for controlling a voltage level at said port on said bistable circuit; a time measuring circuit for measuring a switching time taken for said bistable circuit to switch from said metastable state to one of said stable states following switch on; and control logic for controlling said time measuring circuit, said voltage level control circuit and a switching off and on of said bistable circuit, said control logic being adapted to perform a following sequence: control said voltage level control circuit to set a predetermined voltage level at said port on said bistable circuit, switch said bistable circuit on, detect a measured switching time, and turn said bistable circuit off and if said measured switching time is longer than a predetermined value, output said resolved stable state of said bistable circuit as said random output value.

20 Claims, 13 Drawing Sheets

U.S. PATENT DOCUMENTS

| | | | | |
|---|---|---|---|---|
| 6,829,628 | B2* | 12/2004 | Kim | 708/254 |
| 6,963,888 | B2* | 11/2005 | Weimerskirch | 708/250 |
| 7,124,329 | B2* | 10/2006 | Ackaret et al. | 714/42 |
| 7,325,021 | B2* | 1/2008 | Hars | 708/250 |
| 2003/0236802 | A1* | 12/2003 | Epstein | 708/250 |
| 2004/0019617 | A1 | 1/2004 | Hars | |
| 2005/0004960 | A1 | 1/2005 | Hars | |
| 2009/0037787 | A1* | 2/2009 | Vasyltsov et al. | 714/739 |

FOREIGN PATENT DOCUMENTS

| | | |
|---|---|---|
| JP | 2003-296101 | 10/2003 |

OTHER PUBLICATIONS

D.J. Kinniment et al, "Design of an On-Chip Random Number Generator using Metastability" Proceedings of the $28_{th}$ European Solid-State Circuits Conference, Sep. 2002.

Summary of Japanese official action, Sep. 6, 2011, in corresponding Japanese Application No. JP 2007-265138.

R. Brederlow, et al., A Low-Power True Random Number Generator Using the Random Telegraph Noise of Single Oxide-Traps, ISSCC Dig. Tech. Papers, pp. 532-536, Feb. 2006.

* cited by examiner

Time measuring circuit

Statistical properties of the resolution time $t_d$. As the initial voltage difference is reduced, the mean, sigma and probability of random flips increase. As efficiency is reduced (100%, 70%, 40%, 10%), the probability of random flips increase.

Single cycle random bit generation stages: reset of supply and output nodes; output nodes equalization; charge injection for metastability; and latch resolution Complimentary Comparators

RANDOM NUMBER GENERATOR

This application claims the benefit of Provisional Application No. 60/851,073, filed Oct. 12, 2006, the entire content of which is hereby incorporated by reference in this application.

TECHINICAL FIELD

The technical field relates to data processing and in particular to the generation of a random numbers.

BACKGROUND

The generation of truly random numbers is a difficult task. Different methods have tried to use metastable events to generate a random output value. They all seem to be less than ideal and tend to manipulate the output to restore randomness if they perceive it not to be present. This in itself is a non-random process. For example, some have used a von Neumann corrector to eliminate long runs of 0's and 1's (see for example, R. Brederlow, et al., "A Low-Power True Random Number Generator Using the Random Telegraph Noise of Single Oxide-Traps," *ISSCC Dig. Tech. Papers*, pp. 536-532, February 2006). Such a correction only acts to mask the fact that the initial bit stream was not truly random and it is unable to restore true randomness. Kinniment et al "Design of an On-Chip Random Number Generator using Metastability", Proc European Solid-State circuit conf., pp 595-598 September 2002, discloses a method that uses metastability to amplify thermal noise using an XOR corrector and controls the metastable operation by biasing the system to generate equal numbers of 0's and 1's. However, this endangers the system by generating correlated streams, which actually lack randomness.

SUMMARY

A first aspect provides a circuit for generating a random output value, comprising: a bistable circuit having two stable states in which a 0 or a 1 is output and having a balanced metastable state in which a floating value between 0 and 1 is output, said bistable circuit resolving from said metastable state to one of said stable states on being switched on, said state depending on a voltage level at a port on said bistable circuit; a voltage level. control circuit for controlling a voltage level at said port on said bistable circuit; a time measuring circuit for measuring a switching time taken for said bistable circuit to switch from said metastable state to one of said stable states following switch on; and control logic for controlling said time measuring circuit, said voltage level control circuit and a switching off and on of said bistable circuit, said control logic being adapted to perform a following sequence: control said voltage level control circuit to set a predetermined voltage level at said port on said bistable circuit, switch said bistable circuit on, detect a measured switching time, and turn said bistable circuit off and if said measured switching time is longer than a predetermined value, output said resolved stable state of said bistable circuit as said random output value.

By providing a circuit with a metastable state, the circuit can be balanced at that metastable state and then any switch to a stable state will be due to thermal processes, these thermal processes being random. Thus, this switch to the stable state can be used to generate an output value that is truly random. One potential problem with such a system is that it is not always easy to arrive at the metastable state. However, the inventors recognized that the time taken between switch on and a switch to the stable state is an indication of whether or not the circuit was initially in the metastable state at switch on. In effect, if it switches immediately then it is probable that the circuit did not first balance in the metastable state, however, if it takes a longer time then it was for a while in that metastable state. Thus, not only can a bistable circuit with a metastable state be used to generate a random output value, the time taken for it to switch can be used as a measure as to whether or not it was originally in that metastable and therefore whether or not the output value is indeed a random output value. This avoids the need to judge the randomness of the output value by the output value itself.

In effect the closer the circuit was to the metastable state at switch on the more likely it is that the final resolved state will be due to thermal noise, which is a random physical process. Thus, rather than having to amend an output stream to try to make it more random which is a process that must in itself be flawed, the inputs can be amended to enable the circuit to be closer to its metastable state. In effect the system can be qualified by how a random physical process, thermal noise, affects the system.

In some embodiments, said control logic is adapted to continually perform said sequence to output a plurality of random output values.

Repetition of the sequence can be used to generate a plurality of random values which can be used, for example to form random numbers.

In some embodiments in response to said measured switching time not being longer than said predetermined value for a plurality of consecutive sequences, said control logic is adapted to perform a resetting operation, said resetting operation comprising performing said sequence a plurality of times for different set voltage levels at said port on said bistable circuit and not outputting said resolved stable states during said resetting operation; and following said resetting operation said control logic is adapted to reset said predetermined voltage level to a voltage level value outputting a longest mean switching time during said resetting operation.

In order to ensure that the bistable circuit continues to operate close to its balance point, resetting operations may need to be performed from time to time. Thus, the control logic is adapted to detect if the measured switching time falls below the predetermined value for a number of consecutive sequences, the number being selected depending on circumstances. This shows that the circuit may have drifted away from its optimum operating position. In this case a resetting operation is run. The resetting operation varies the voltage level at the port on the bistable circuit, and performs the sequence a certain number of times for each different voltage level set and then selects the set voltage level that produced the longest mean switching time and resets this as the predetermined voltage level for subsequent sequences. The closer the circuit stays to starting at its metastable state the more resolved states there are that are random and can be output as random values. Thus, it is desirable to keep it as close as possible and this is done in embodiments by detecting when the circuit drifts from this state and performing resetting operations where required.

In some embodiments during said resetting operation said control logic is adapted to amend said set voltage level by a predetermined amount for an initial and subsequent set of sequences such that said mean switching time increases, and then to amend said set voltage level by said predetermined amount for a further set of sequences until said mean switching time decreases.

It may be advantageous to control the amendment of the voltage level during reset such that initially the switching time increases for each set of sequences and then the switching time starts to decrease. If this occurs then it is known that the voltage balance point has been passed through and provided the voltage is not adjusted by too large an amount the metastable state will probably have been achieved and thus, the longest mean measured switching time for a set of sequences will correspond to the metastable state at switch on and the voltage that produced it will be a suitable predetermined value.

In some embodiments, during said resetting operation said control logic is adapted to amend said voltage level set at switch on to increase said mean switching time compared to a previous sequence and in response to said mean switching time exceeding said predetermined value to set said voltage level as said predetermined voltage level output said resolved value as said random output value.

The resetting operation may amend the voltage until the mean switching time is greater than the predetermined value and then adjust the voltage level to this value. As the predetermined value was selected to indicate that the metastable state had been achieved then this provides an acceptable way of resetting the voltage level.

This predetermined value may be stored in a data store within the circuit. It can be permanently stored in the circuit following calibration at manufacture, or the circuit can be calibrated in use, in which case it can be intermittently updated. Alternatively, it can be input externally if required.

In some embodiments, said predetermined value is generated in response to said control circuit performing a calibrating operation, said calibration operation comprising: performing said sequences a plurality of times for different set voltage levels without outputting said resolved stable state and determining a longest mean switching time, said control circuit being adapted to perform further sequences a plurality of times with said voltage level set to said voltage level that generated said longest mean switching time, said control circuit being adapted to analyse said resolved stable states generated by said further sequences to determine if said latch is at said metastable state at switch on, and if it is to store said longest mean switching time of said further sequences as said predetermined value.

The circuit can be calibrated to determine the predetermined value of the measuring time that produces a metastable state. It can be calibrated initially and/or again during operation if required. This may be needed, for example, if even following reset there are many consecutive sequences that resolve too quickly.

In some embodiments, if said analysis determines that said latch is not at said metastable state at switch on said circuit is operable to output an error indicator.

A further advantage of using a predetermined value is that if the measured switching time does not get to exceed this value there may be an error in the system and an error indicator can be output. This may be useful if the system is under attack with deterministic noise. In such a case then a metastable state will not be reached and the error indicator would help to detect this problem which could then be addressed.

In some embodiments, said circuit comprises a further port, said port and said further port outputting said output value, said voltage level control circuit controlling a voltage difference between said port and said further port at switch on by providing a constant voltage at said further port and said set voltage level at said port at switch on.

In many embodiments the bistable circuit will have two ports and the voltage level is set as a voltage difference between the two ports a constant voltage being provided at one and the varying voltage being provided at the other.

Although the bistable circuit can be formed from any elements that have two stable states and a metastable state, a cross couple inverter pair is particularly appropriate for this circuit as it is simple to build and has a metastable state.

In some embodiments, said bistable circuit is powered by high and low voltage rails and said control circuit is adapted to turn said bistable circuit on by providing a voltage difference across said high and low voltage rails and to turn said bistable circuit off by providing an equal voltage of half said voltage difference at each of said voltage rails.

The switching on and off of the circuit will clearly affect the switching time from the metastable to the bistable state and thus, should be done in a controlled way. In embodiments both voltage rails are set to the same intermediate voltage and then at switch on the voltage levels at the rails are changed to their respective high and low values.

In some embodiments, said time measuring circuit comprises a counter comprising a series array of flip flops each clocked by a progressively further delayed switch on signal for said bistable circuit said counter being stopped in response to a signal indicating said bistable circuit has switched to a stable state.

Although the time can be measured in a number of ways a simple and accurate way of doing it is to use a counter comprising a series array of flip flops each clocked by a progressively delayed switch on signal and being stopped in response to the bistable circuit switching to the stable state.

In some embodiments, said random output value is generated a plurality of times and said plurality of random output values are output as a random number.

This circuit is generally used to generate a random number. Thus, the random output values can be generated a number of times to produce this random number.

In other embodiments, a plurality of circuits according to a first aspect are arranged with their outputs in parallel with each other to generate a random number.

A second aspect provides a method for generating a random output value, comprising the steps of: (i) generating a predetermined voltage level and inputting said voltage level to a bistable circuit, said bistable circuit having two stable states respectively generating a 0 or a 1 as an output value and having a balanced metastable state with a floating output value between 0 and 1, said bistable circuit resolving from said metastable state to one of said stable states on being switched on, said state of said bistable circuit depending on said input voltage level;

(ii) switching said bistable circuit on;

(iii) measuring a time taken for said bistable circuit to switch from said metastable state to one of said stable states; and (iv) if said time is longer than a predetermined value outputting said resolved state as said random output value.

A third aspect provides a means for generating a random output value, comprising: a bistable means having two stable states in which a 0 or a 1 is output and having a balanced metastable state in which a floating value between 0 and 1 is output, said bistable means resolving from said metastable state to one of said stable states on being switched on, said state depending on a voltage level at a port on said bistable means; a voltage level control means for controlling a voltage level at said port on said bistable means; a switching time measuring means for measuring a switching time taken for said bistable circuit to switch from said metastable state to one of said stable states following switch on; and control means for controlling a voltage level control means, said switching time measuring means and a switching on and off of said bistable means, said control means being adapted to perform a following sequence: control said voltage level control means to set a predetermined voltage level at said port of said bistable means, switch said bistable means on, detect a measured switching time; sand if said measured switching time is longer than a predetermined value, output said resolved stable state of said bistable means as said random output value.

DETAILED DESCRIPTION OF EXAMPLE EMBODIMENTS

Figure 1:
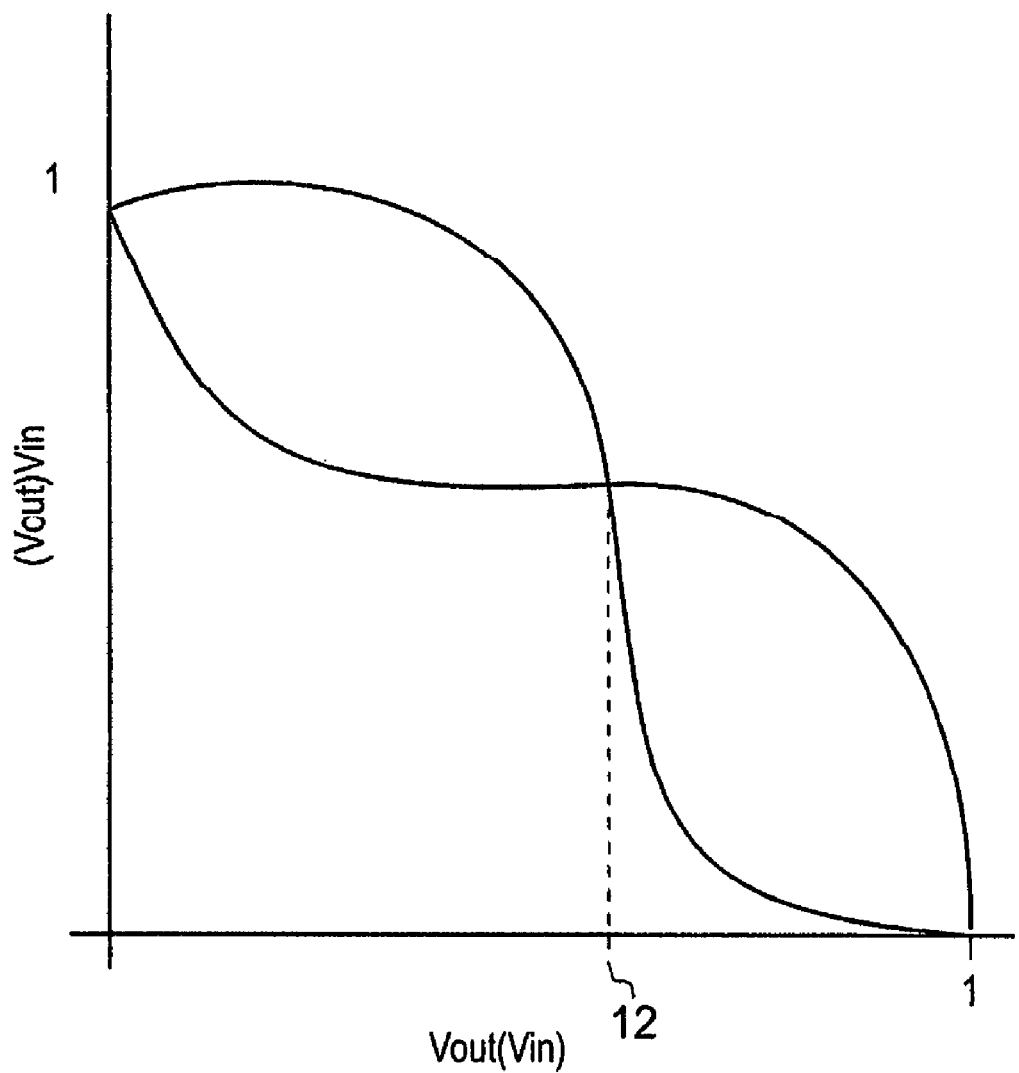
FIG. 1 shows a bistable circuit according to an example embodiment and a graph showing the difference between input voltage and output voltage of each of the inverters.
Figure 1:
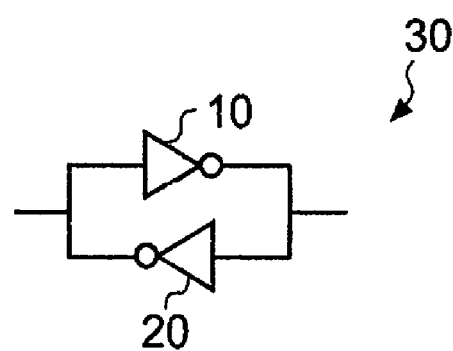

FIG. 1 shows a bistable circuit 30 according to an example embodiment and a graph showing the difference between input voltage and output voltage of each of the inverters 10 and 20. As can be seen from the graph with the input voltage at 0 the corresponding output voltage is 1 for each inverter. As the input voltage increases the corresponding output voltage stays at approximately 1 until the voltage reaches about 0.5 whereupon the output voltage stays at this value for a while until the input voltage reaches a larger value whereupon it switches to a 1. The input/output voltage of the other inverter is also shown and follows a similar pattern. Thus, at the point marked by the dotted line and indicated by 12 there is a metastable state wherein if the input voltage is set at this value the two inverters are balanced and a small change in voltage causes the system to flip to one of its stable states where it outputs to 0 or a 1. A metastable state is therefore only temporarily stable and such things as thermal noise are enough to flip it out of that state. Thus, if the metastable state can be attained a flip out of the state can occur due to thermal noise and as such should be random.

Figure 2:
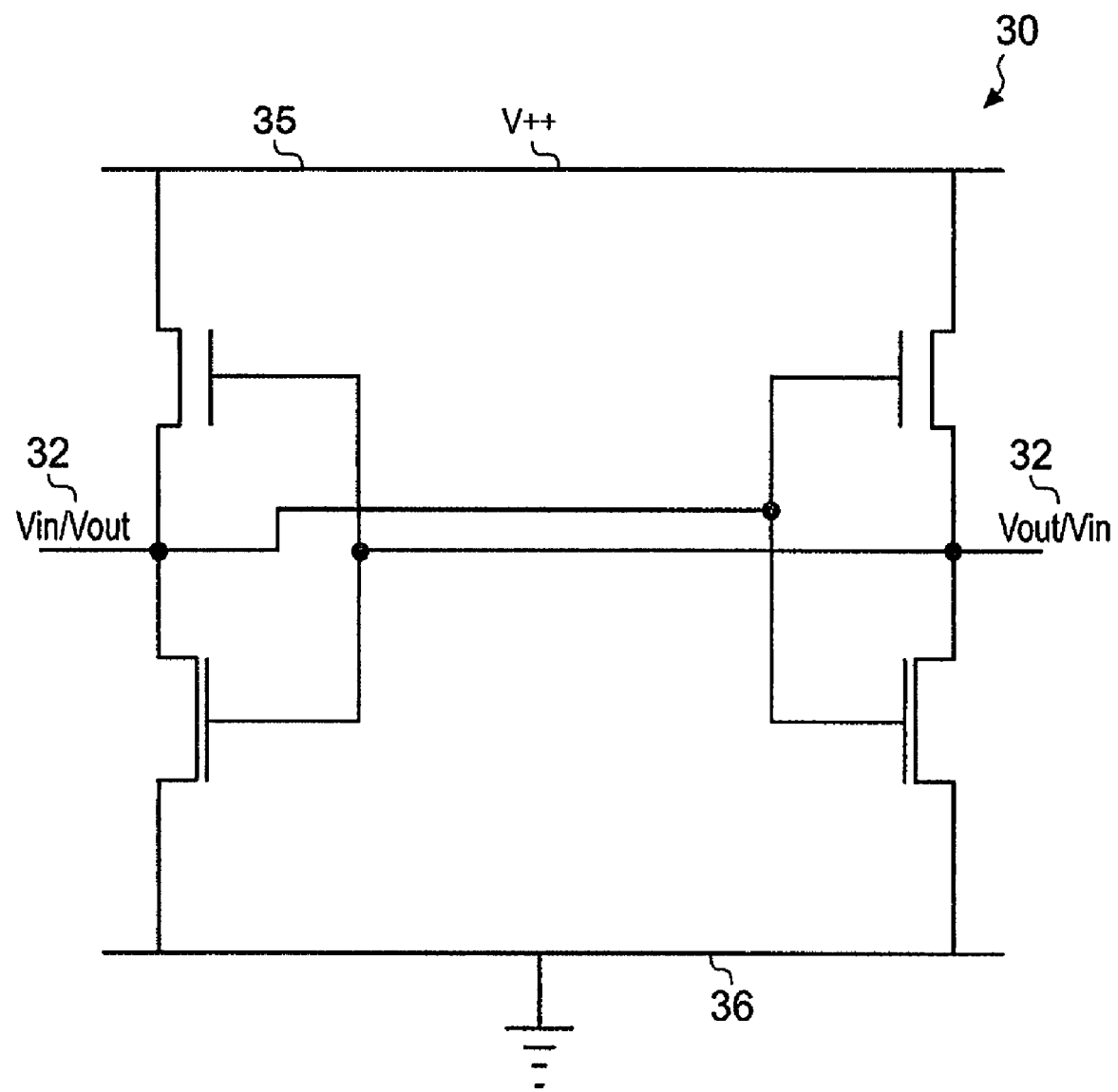
FIG. 2 shows the bistable circuit of FIG. 1 in transistor form.

FIG. 2 shows the bistable circuit 30 which is in this embodiment a cross couple inverter pair in transistor form. As can be seen there is a positive voltage rail 35 and an earth rail 36 and voltage output and input ports 32.

Figure 3:
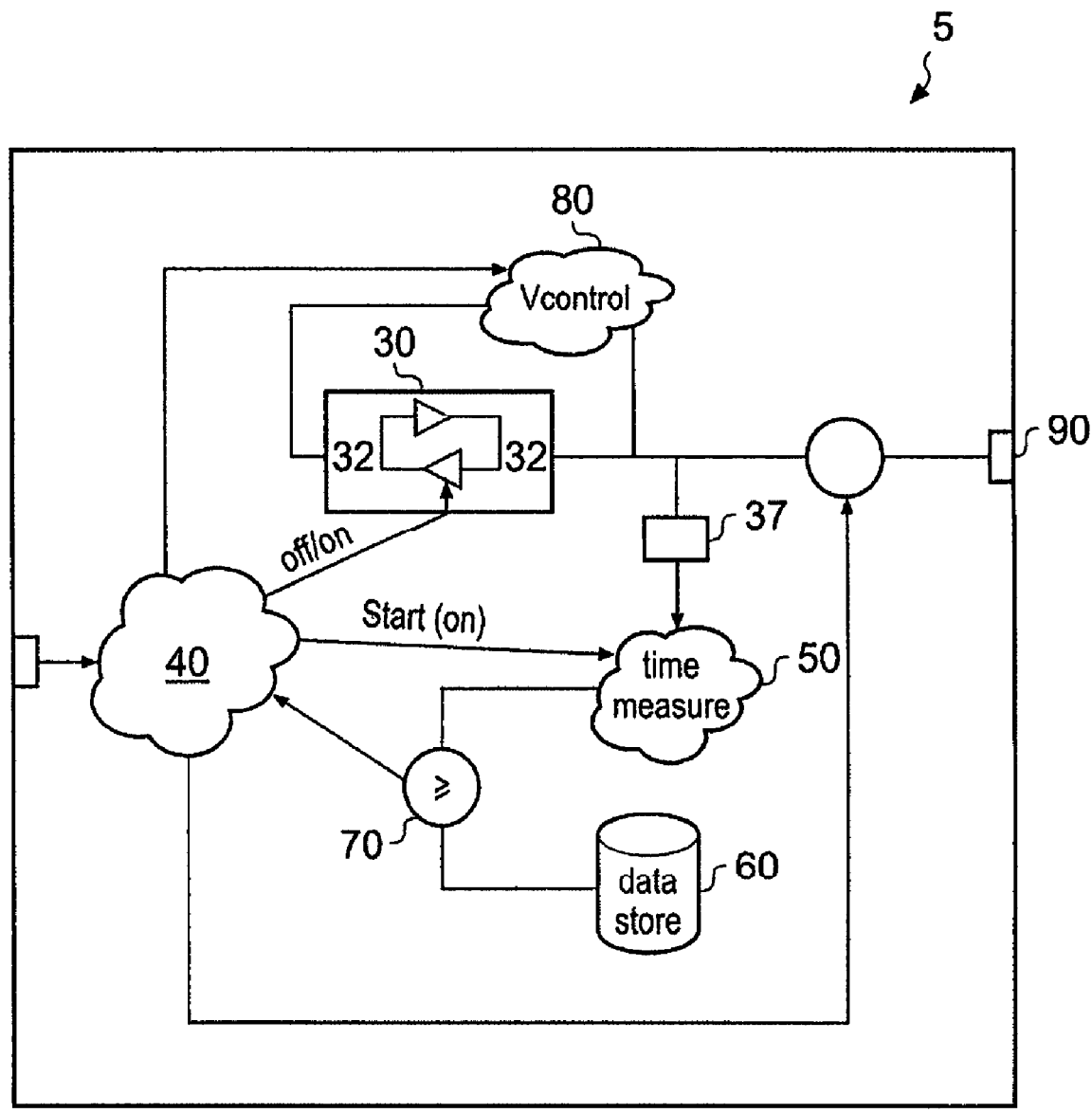
FIG. 3 shows a circuit according to an example embodiment.

FIG. 3 shows a circuit 5 according to an example embodiment. Circuit 5 comprises control logic 40, time measuring circuit 50, data store 60, comparator 70, bistable circuit 30 and voltage control circuit 80. In operation control logic 40 initiates a sequence of measurements in response to an input signal by sending an off signal to bistable circuit 30 which sets the voltage rails of this circuit to an intermediate voltage which in this case is 0.5 volts each. It then sends a control signal to the voltage control circuit 80 which sets a voltage level at the ports 32 to a first level for a first measurement. This is done by setting a constant voltage on one of the ports and a predetermined voltage on the other, this predetermined voltage may be the same as the constant voltage or it might be a slight offset to this voltage. A start or on signal is then sent from control circuit 40 to bistable circuit 30 which sets the voltage rails to 1 volt and earth respectively. This start signal is also sent to time measurement circuit 50, this time measurement circuit then measures the time until bistable circuit 30 flips to a stable state at which point either a zero or one is output at ports 32 and this flip triggers circuit 37 to trigger a stop signal to stop the time measurement.

The measured switching time is then compared by comparator 70 with the stored value in data store 60 and if it greater than this value then the output value from bistable circuit 30 is deemed to be random and is output at data output 90 as a random output value. If it is not greater than this value then control logic 40 does not output this value. The bistable circuit 30 is then turned off and the measurement sequence repeated and if the measured switching time is greater than the value stored in data store 60, then this value is output as a (further) random output value. This continues until a required number of random values have been output or until the measured switching time is less than the value stored in data store a certain number of consecutive times. If this happens it indicates that the circuit is no longer operating near its balance point and may need resetting. It should be noted that although in this embodiment triggering of reset occurs in response to exceeding a certain number of consecutive times, in other embodiments it may be triggered by exceeding a predetermined fraction of total times.

A resetting operation involves performing the measurement sequence described above a predetermined number of times each for slightly adjusted control voltage levels set by voltage control circuit 80. This repetition of the sequence is continued until a maximum mean measured switching time is found. When this has been found the voltage levels output by voltage level control circuit to achieve this time are then used as the voltage levels in future measurement sequences. It should be noted that the sequences have to be performed a number of times for each input voltage level as the switch from a metastable state is determined by a random process and thus, will be achieved with different times. An average or mean measurement time is needed to determine which voltage produces a balanced state.

If following reset, there is again a number of consecutive measurement sequences that do not produce a long enough measurement time, then the system can be calibrated again to store a different value in data store 60. To do this the set or measurement sequences are performed for different voltage levels and a maximum mean switching time is found. The voltage level from voltage control circuit 80 which produced this maximum mean switching time is then used as an input to the circuit a number of times and the output values output at 90 are analysed statistically to see if they are indeed random. If they are then the switching time which produced this value is stored in data store 60 as the new predetermined value and the sequence is repeated again for what is in effect a recalibrated system.

If they are not random then an error is output as the circuit is not achieving its metastable state which may be due to deterministic noise or a circuit that is unbalanced for some reason.

As has been disclosed the measurement sequence can be repeated several times to produce a plurality of random output values which can be used as a random number. Alternatively, a number of these circuits can be placed in parallel and their respective outputs 90 used to produce a random number.

Figure 4A:
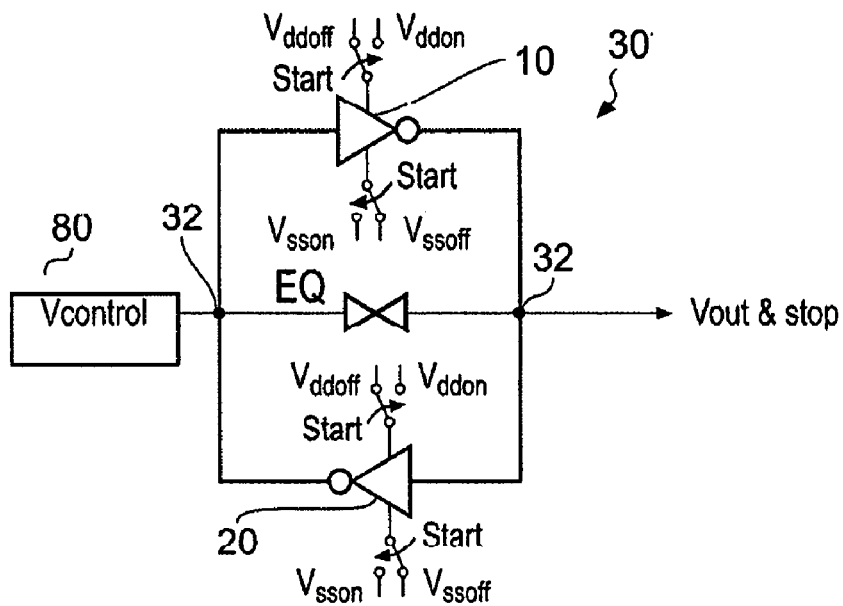
FIG. 4a shows a bistable circuit and a voltage control circuit according to an example embodiment.

FIG. 4a shows bistable circuit 30 with voltage control 80 in more detail. Bistable circuit 30 comprises a cross coupled inverter pair 10, 20 which comprise switches to turn them on and off. These switches connect the individual inverters to their voltage rails or to an intermediate voltage. The start signals that are sent to operate these switches are also sent to the time measurement circuit 50 of FIGS. 3 and 4C to initiate time measurement.

The bistable circuit 30 has a voltage control circuit 80 connected to its ports 32 with an equaliser across the middle. On initialisation or reset these ports 32 are set to have slightly different voltages for a set of measurement sequences. These slightly different voltage levels are changed for each set of measurement sequences and the mean time taken for the bistable circuit to reach a stable state is measured for each set and will depend on this difference in the voltage. The ports 32 that receive the voltage control signal also output the voltage level and this signal is also used to trigger a stop signal in that when this switches to the stable state this is used to trigger the stop signal for the time measuring circuit 50.

Figure 4B:
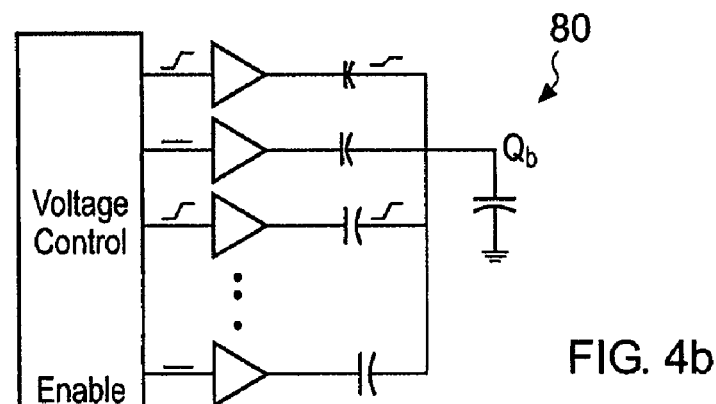
FIG. 4b shows the voltage control circuit of FIG. 4a in more detail.

FIG. 4b shows the voltage control circuit in more detail. The circuit that sets the input voltage to the inverters has a DC reference voltage bias and an array of capacitors that inject charge into the ports by the effect of capacitive coupling. The amount of charge injected is programmed by the control algorithm that tunes the latch into metastability. The control configuration is fed into the enable signal of drivers that switch the array of capacitors. The amount of charge that is fed into the ports is dependent upon the voltage level set. Thus, the circuit can be seen as setting the voltage level at the port or it can be seen as injecting charge into it.

Figure 4C:
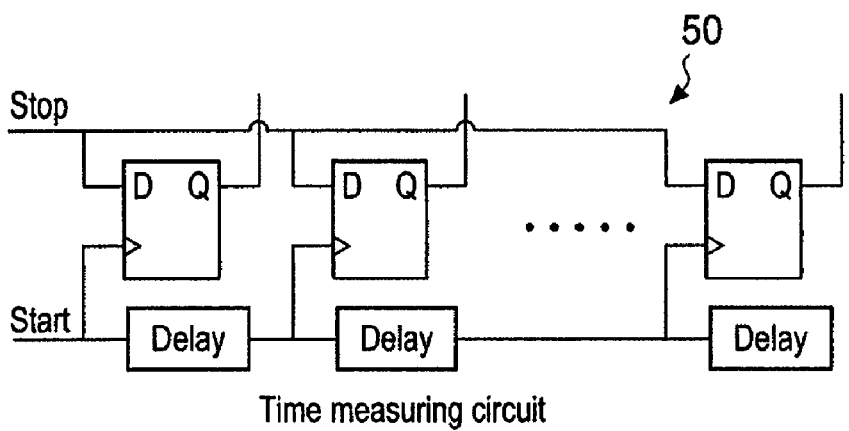
FIG. 4c shows the time measuring circuit of FIG. 3 in more detail.

FIG. 4c shows the circuit that measures the time it takes for the latch to resolve itself from the metastable to the stable state. The start signal that is input to time measuring circuit 50 is the same as the start signal that is input to bistable latch 30. The stop signal is generated in response to bistable circuit 30 switching to its stable state. Time measuring circuit 50 is composed of a series array of flip flops clocked by delayed versions of the start signal and which also capture the stop signal. The output of this series array is configured in a thermometer code that indicates how many delayed stages the difference between the start and stop signal is quantised to. To increase its range a counter that determines how many times the start signal has gone around the array may be included.

The stop signal is generated by a circuit 37 (see FIG. 3) that determines when the latch has finally resolved its state. In some embodiments this circuit is a pair of differential amplifiers that are used as comparators against two voltages close to the positive and negative power supply. The output of the comparators is fed to a logic XOR gate that will only evaluate true when one of the comparators output is true (see FIG. 12).

Figure 5:
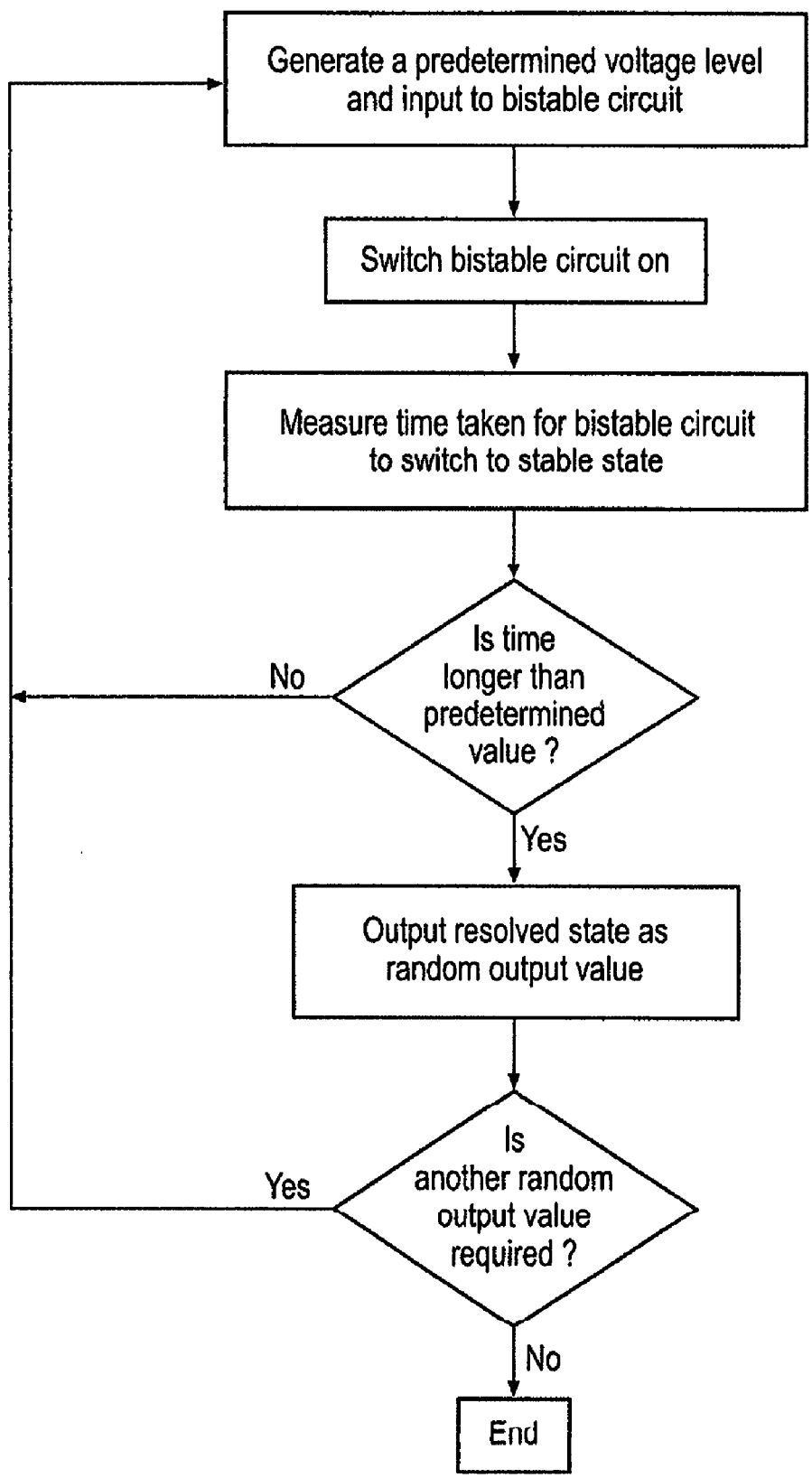
FIG. 5 is a flow diagram showing a method of generating a random number

FIG. 5 is a flow diagram showing a method of generating a random number according to an example embodiment. Initially a predetermined voltage level is generated and input to the bistable circuit. The bistable circuit is then switched on and the time taken for it to switch to a stable state is measured. This time is then assessed to see if it is longer than a predetermined value. If it is then the circuit was initially in a metastable state and the switch to the stable state was due to thermal noise and thus, the stable state was generated through a random process and can be used as a random output value. If it was no longer than this value, then the resolved state is not used as a random value, rather the process is repeated until the resolved state is achieved in a time period longer than the predetermined value.

A summary of a true random number generator (tRNG) according to a particular embodiment are given below.

The below proposed metastability based tRNG achieves high entropy and passes NIST randomness test by grading the randomness of the metastable events measuring the resolution time, regardless of the output bit values, which allows it to determine the original noise level at the time of metastability and to tune itself for maximum randomness. The fully integrated tRNG was fabricated and measured in a 0.13 µm technology in 0.036 mm$^2$.

True Random Number Generators (tRNG) use a physical source of randomness (e.g. Thermal noise, telegraph noise) to generate a random bit stream. However, they are very sensitive to undesired deterministic noise, such as supply noise, process variations or deliberate attacks. The random number generator presented below provides a metastability based tRNG that is able to counteract such deterministic events and to qualify the output stream according to the actual randomness of the system.

The tRNG method controls the metastable operation without observing the generated output bits. Instead, the resolution time of each metastable event is recorded, (regardless of the 0, 1 outcome) which allows the system to determine the original noise level at the time of metastability and the randomness of the event. This allows the control to "grade" the quality of the output bits and to tune the system for maximum randomness. The proposed method furthermore allows the user to tradeoff the quality of the bit stream with the bit production rate. The fully integrated tRNG was fabricated in a 0.13 µm technology in 0.036 mm$^2$. The generated bit streams achieve high entropy and passed NIST randomness tests without the aid of a corrector.

Figure 6:
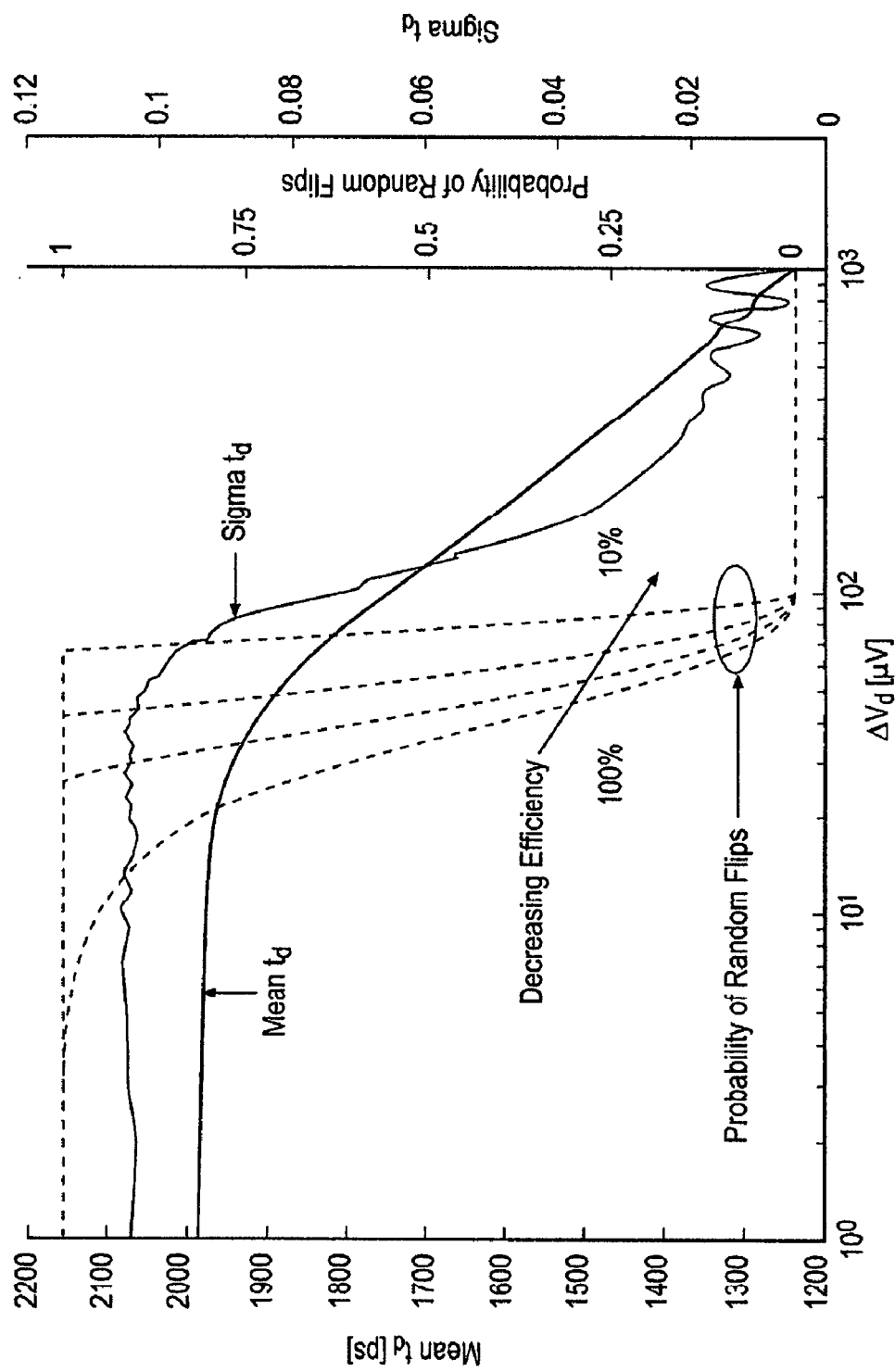
FIG. 6 shows the statistical properties of the resolution time with voltage difference.

The tRNG uses a latch operating near the metastable state where the final state is upset by thermal noise of the devices giving rise to random output values. However, if the initial latch voltages are not at the metastable point, due to mismatch or external noise, the latch will have a deterministic output value. This method observes that the randomness of a metastable event can be determined by measuring the time it takes the latch to resolve. The resolution time can be modeled as $t_d = \tau_r \cdot \ln(K_f/\Delta V_i)$, where $\tau_r$ and $K_f$ are device and circuit dependent constants and $\Delta V_i$ is the initial voltage difference from the metastable point. $\Delta V_i$ has two components: a deterministic voltage difference $\Delta V_d$ (e.g. external noise, power supply noise, etc.) and the thermal random noise $V_n$, $\Delta V_i = \Delta V_d + V_n$. By observing $t_d$, it is possible to compute the original voltage differential $\Delta V_i$. Given that the thermal noise in MOS semiconductor devices can be modeled as a normal random variable with zero mean and variance $\sigma^2 = 4kT\gamma g_m \Delta f$, the probability that the final metastable outcome is dictated by thermal noise can be computed. This is illustrated in FIG. 6 where repeated simulations of a metastable system are performed, for different values of $\Delta V_d$. When $\Delta V_d \gg V_n$, the probability of random bit flips is low because the system is dominated by the deterministic noise, and hence, the mean and variance of $t_d$ ($\bar{t}_d$ and $\sigma t_d$) are small. As $\Delta V_d$ is reduced, the probability of random outcomes as well as $\bar{t}_d$ and $\sigma t_d$ increase as the system becomes dominated by thermal noise. It is therefore possible to tune a latch to metastable operation by evaluating the statistics of $t_d$. Also, the $t_d$ values of individual metastability events can be used to further filter the output stream when $\Delta V_d \approx V_n$. As shown in FIG. 6, increasing the $t_d$ filtering threshold results in a higher probability of random bit flips at the expense of a reduced bit production rate.

Figure 7:
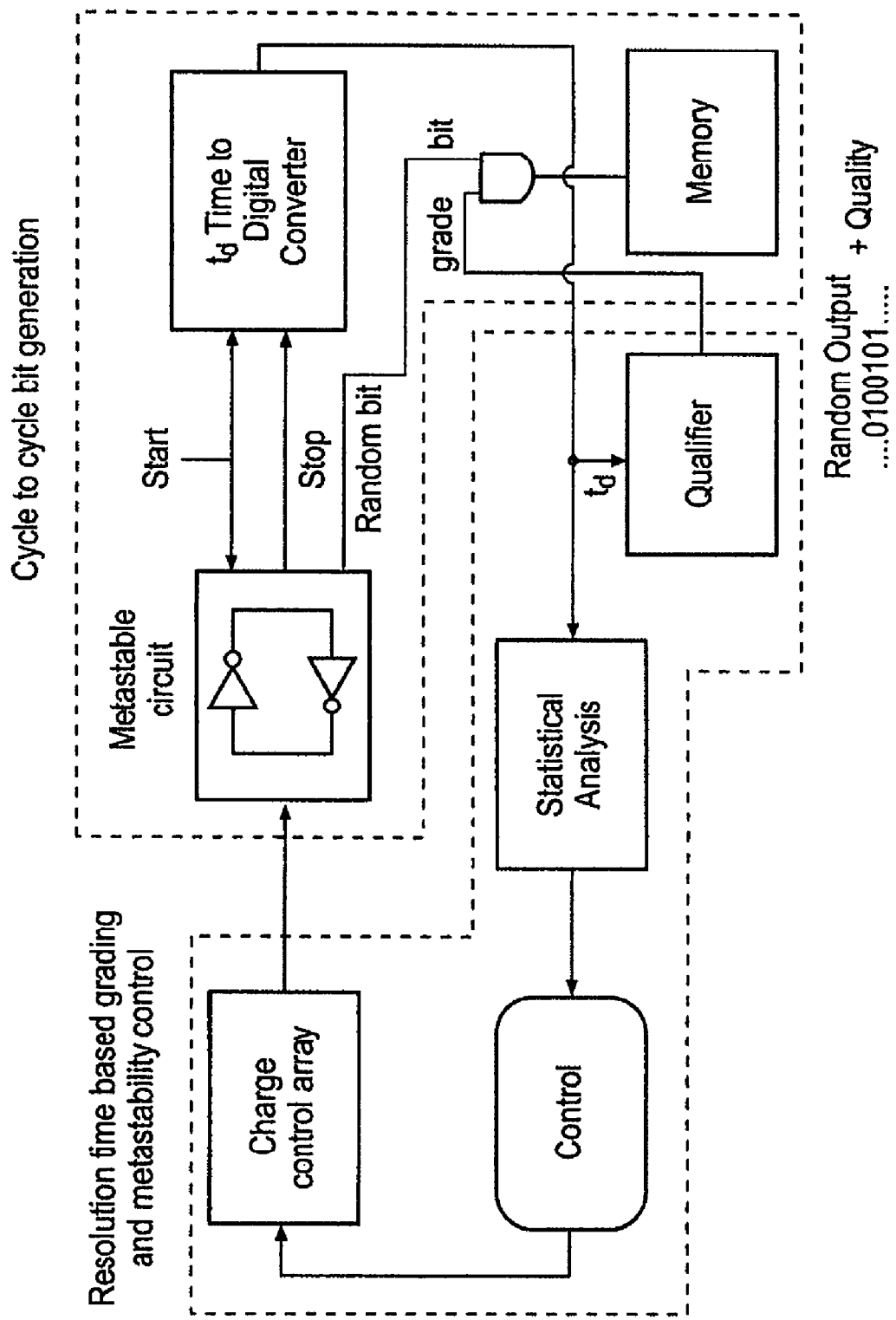
FIG. 7 shows a block diagram of a random number generator with cycle to cycle random bit generation and control and grading modules.
Figure 8:
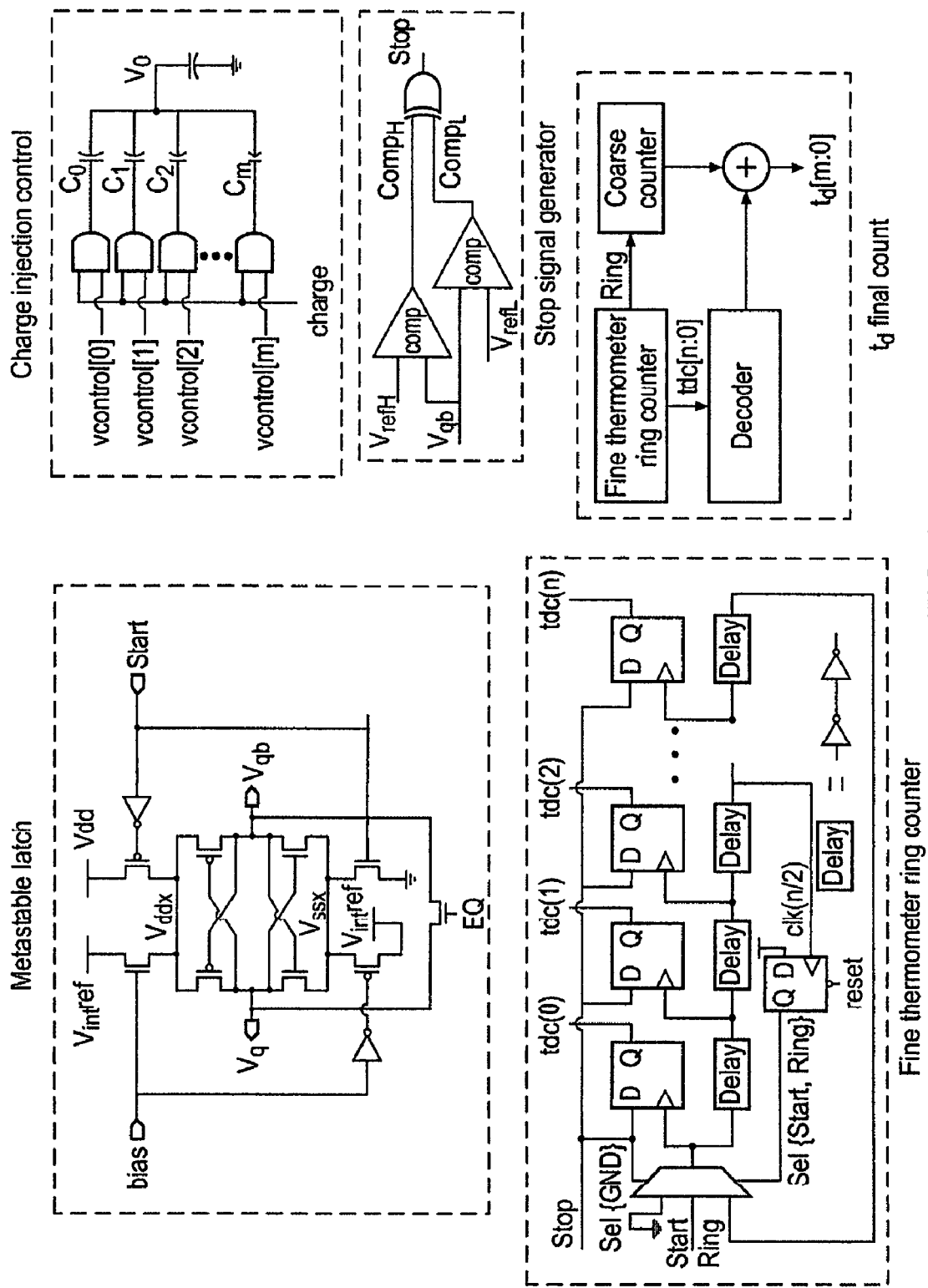
FIG. 8 shows a metastable latch, stop signal generation and time to digital converter circuits.
Figure 9:
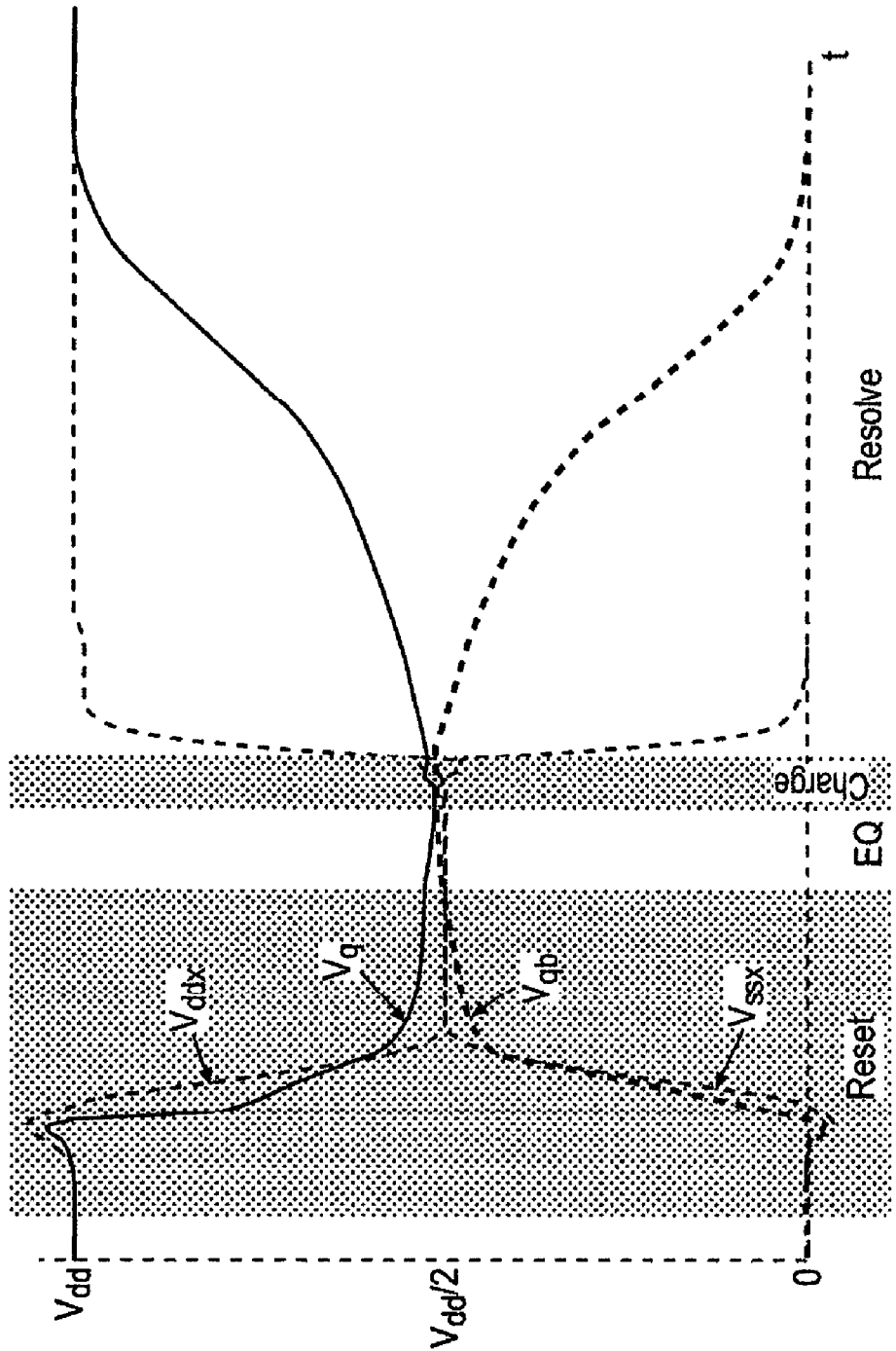
FIG. 9 shows the temporal behavior of the signals that control the metastable latch and its outputs.
Figure 12:
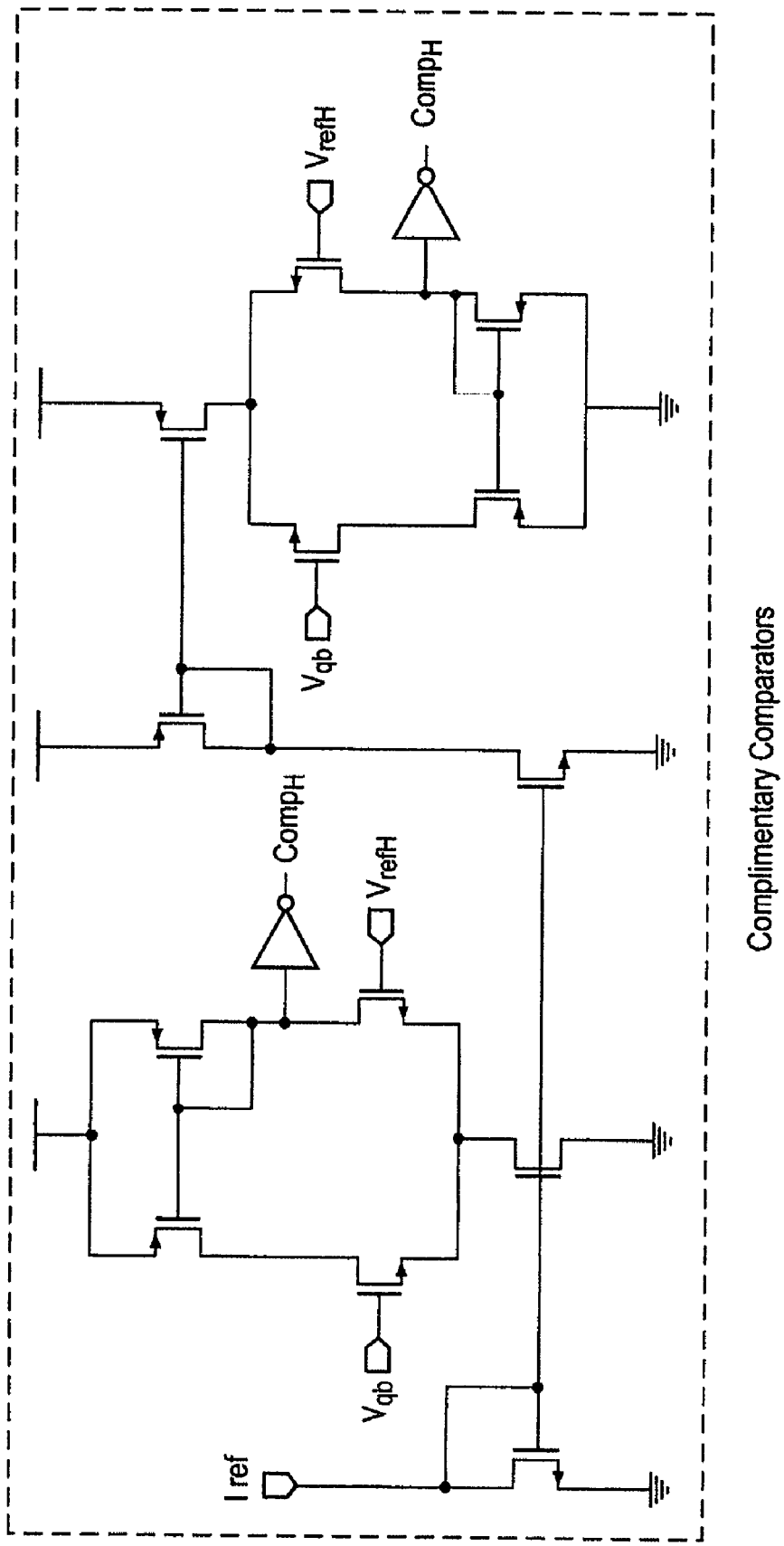
FIG. 12 shows complementary comparator circuits.

The control and grading system of the tRNG is shown in FIG. 7. There are two elements to the operation: cycle to cycle generation of output bits by the latch, which are graded and stored in memory, and calculation of resolution time statistics used in metastability control. The metastability latch, shown in FIG. 8, is reset by collapsing the supplies to half $V_{dd}$ and equalizing the output nodes by asserting the EQ, Bias and Start signals. Following this, charge is induced on node q by the control module that tunes the latch into metastability. The charge injection circuit uses capacitive coupling and consists of an array of capacitors ranging from 0.25 to 100 fF. Through charge injection, the voltage on node q can be varied by 16 mV with a resolution of 10 uV. However, it was found in silicon that with 120 uV control resolution, the latch could be brought into sufficiently metastable operation to obtain qualified random outputs when using $t_d$ based filtering. After charge injection, the latch is activated by restoring the supplies to full $V_{dd}$ and asserting Start. The latch output then resolves to its final state and the Stop signal is generated using a pair of complementary comparators (FIG. 12). FIG. 9 shows in more detail the temporal behavior of the signals that control the metastable latch and its outputs.

A Time to Digital Converter (TDC) is used to determine $t_d$ (FIG. 8). It is composed of two parts: a fine counter that has a resolution of 50 ps; and a coarse counter that extends the range of the TDC to 20 ns. The fine counter contains an array of flip-flops clocked by delayed versions of the Start signal that sample in discrete times the Stop signal, producing a thermometer code with quantized values of the time difference between Start and Stop. The coarse counter is asserted every time the delayed Start signal goes around the ring.

Figure 10A:
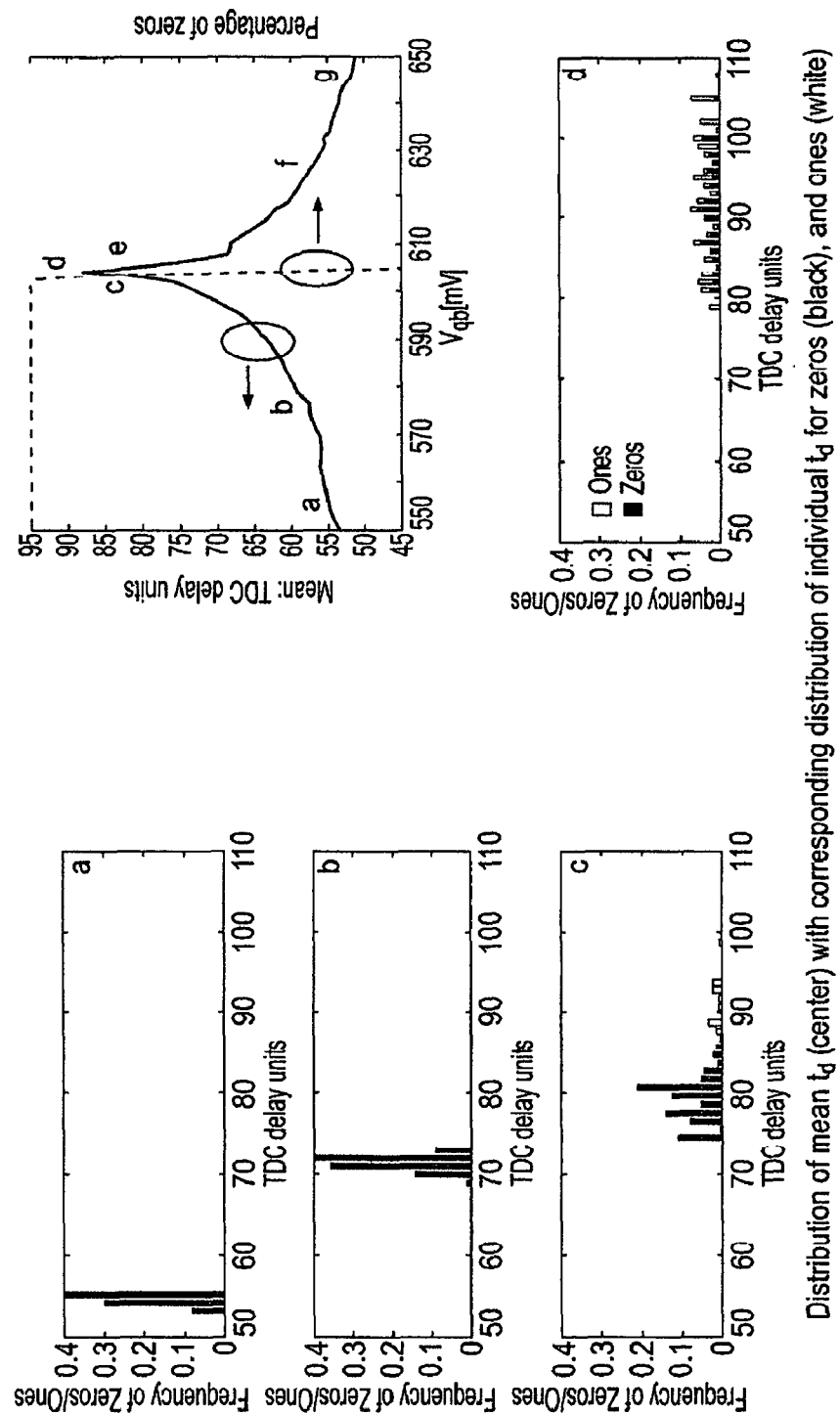
FIGS. 10A and 10B show distribution of mean resolution time of the bistable circuit.
Figure 10B:
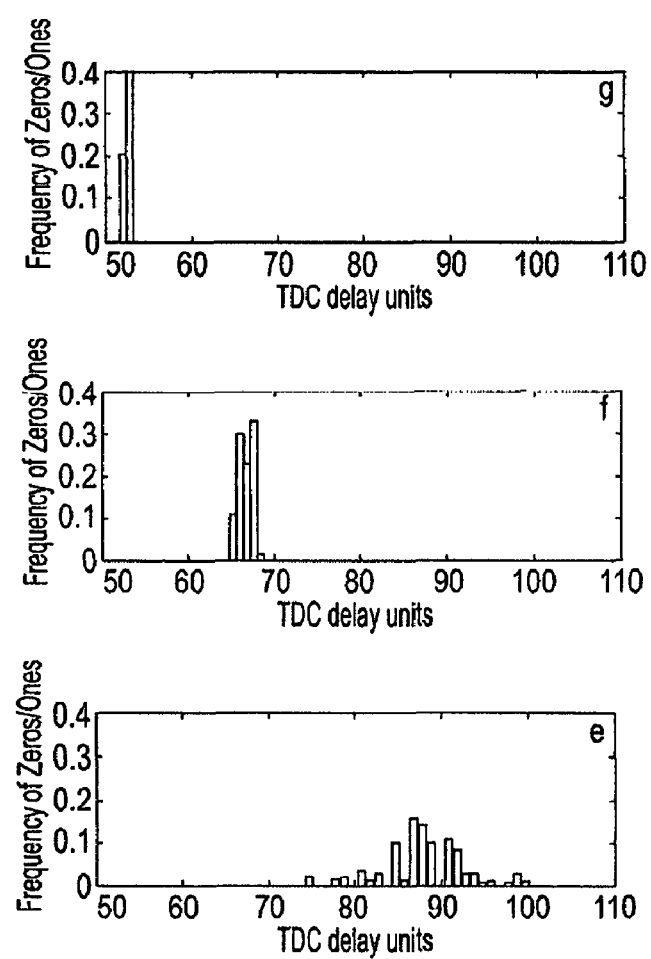

In order to tune the latch into metastability, the control algorithm maximizes the mean value of $t_d$, $\bar{t}_d$. FIGS. 10A and 10B show the measured distribution of $t_d$ and the associated value of $\bar{t}_d$ for sets of 128 samples as the injected charge is swept. As expected, biasing the system below or above the metastability point (~604 mV) results in a small $\bar{t}_d$ and $\sigma t_d$ and a biased bit stream of all 0's or 1's. As the system approaches metastability, $\bar{t}_d$ increases rapidly, allowing for excellent control feedback. In addition, the spread of $t_d$ increases as well and the percentage of 0's and 1's in the output stream reaches 50%. The statistical characteristics of $t_d$, and the distribution of 0/1s also tracked very well with temperature for a measured range of 10 to 60° C.

Figure 11:
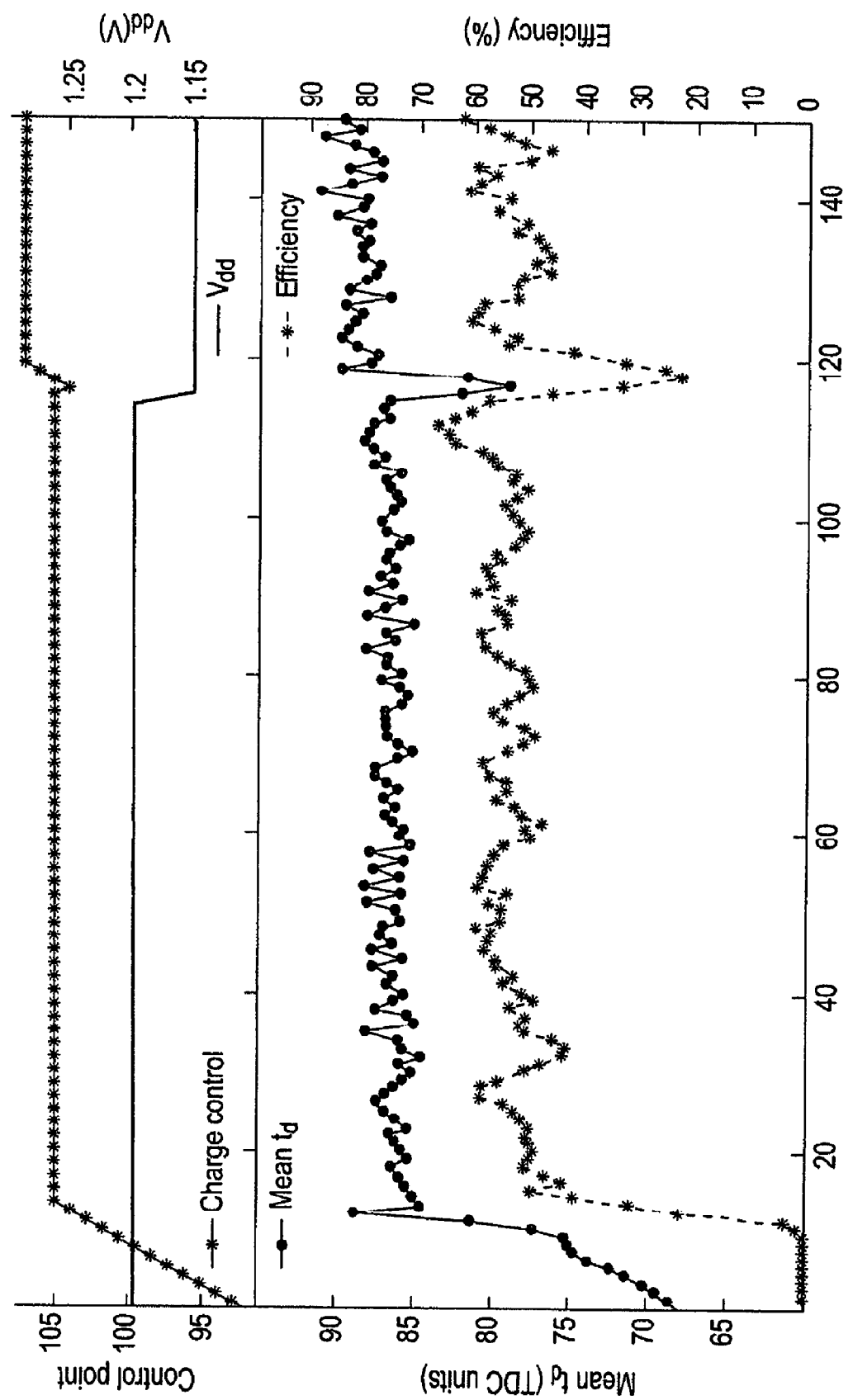
FIG. 11 shows the tuning algorithm.

FIG. 11 shows the operation of the control algorithm for the test chip as it responds to deterministic noise. Mean td is plotted as the configuration of the control module is changed to maximize the value of mean td. The system locks into metastable operation after iteration 10. At iteration 115, a 50 mV supply voltage droop is induced in the power supply as shown by the Vdd trace. The mean td is reduced dramatically by more than 5 TDC-units as the metastable point is shifted due to the induced noise. The system responds in 10 iterations by adjusting the configuration of the control and stabilizes with a new maximum of mean td. The new stable operating point has a higher td due to the degradation in the drive strength resulting from the voltage droop. The efficiency of the system when filtering with a constant td threshold tracks very well to the behavior of td, thereby showing that more filtering is needed for events that have lower values of td.

Although illustrative example embodiments have been described in detail herein with reference to the accompanying drawings, it is to be understood that the claims are not limited to those precise embodiments, and that various changes and modifications can be effected therein by one skilled in the art without departing from the scope and spirit of the claims.

We claim:

1. A circuit for generating a random output value, comprising:
   a bistable circuit having two stable states in which a 0 or a 1 is output and having a balanced metastable state in which a floating value between 0 and 1 is output, said bistable circuit resolving from said metastable state to one of said stable states on being switched on, attainment of said metastable state depending on a voltage level at a port on said bistable circuit;
   a voltage level control circuit for controlling a voltage level at said port on said bistable circuit;
   a time measuring circuit for measuring a switching time taken for said bistable circuit to switch from said metastable state to one of said stable states following switch on; and
   control logic for controlling said time measuring circuit, said voltage level control circuit and a switching off and on of said bistable circuit, said control logic being adapted to perform a following sequence: control said voltage level control circuit to set a predetermined voltage level at said port on said bistable circuit, switch said bistable circuit on, detect a measured switching time, and turn said bistable circuit off and if said measured switching time is longer than a predetermined value, output said resolved stable state of said bistable circuit as said random output value;
   wherein said control logic is adapted to perform a resetting operation including performing said sequence a plurality of times for different set voltage levels at said port on said bistable circuit and not outputting said resolved stable states during said resetting operation, and following said resetting operation, said control logic is adapted to reset said predetermined voltage level to a voltage level value outputting a longest mean switching time during said resetting operation.

2. A circuit according to claim 1, said control logic being adapted to continually perform said sequence to output a plurality of random output values.

3. A circuit according to claim 1, wherein said control logic is adapted to perform said resetting operation in response to said measured switching time not being longer than said predetermined value for a plurality of consecutive sequences.

4. A circuit according to claim 3, wherein during said resetting operation said control logic is adapted to amend said set voltage level by a predetermined amount for an initial and subsequent set of sequences such that said mean switching time increases, and then to amend said set voltage level by said predetermined amount for a further set of sequences until said mean switching time decreases.

5. A circuit according to claim 3, wherein during said resetting operation said control logic is adapted to amend said voltage level set at switch on to increase said mean switching time compared to a previous sequence and in response to said mean switching time exceeding said predetermined value to set said voltage level as said predetermined voltage level.

6. A circuit according to claim 5, wherein said predetermined value is stored in a data store within said circuit.

7. A circuit according to claim 1, wherein said predetermined value is generated in response to said control circuit performing a calibrating operation, said calibration operation comprising: performing said sequences a plurality of times for different set voltage levels without outputting said resolved stable state and determining a longest mean switching time, said control circuit being adapted to perform further sequences a plurality of times with said voltage level set to said voltage level that generated said longest mean switching time, said control circuit being adapted to analyse said resolved stable states generated by said further sequences to determine if said bistable circuit is at said metastable state at switch on, and if it is to store said longest mean switching time of said further sequences as said predetermined value.

8. A circuit according to claim 7, wherein if said analysis determines that said bistable circuit is not at said metastable state at switch on, said circuit is operable to output an error indicator.

9. A circuit according to claim 1, wherein said circuit comprises a further port, said port and said further port outputting said output value, said voltage level control circuit controlling a voltage difference between said port and said further port at switch on by providing a constant voltage at said further port and said set voltage level at said port.

10. A circuit according to claim 1, wherein said bistable circuit comprises a cross coupled inverter pair.

11. A circuit according to claim 1, wherein said bistable circuit is powered by high and low voltage rails and said control circuit is adapted to turn said bistable circuit on by providing a voltage difference across said high and low voltage rails and to turn said bistable circuit off by providing an equal voltage of half said voltage difference at each of said voltage rails.

12. A circuit according to claim 1, wherein said time measuring circuit comprises a counter comprising a series array of flip flops each clocked by a progressively further delayed switch on signal for said bistable circuit said counter being stopped in response to a signal indicating said bistable circuit has switched to a stable state.

13. A circuit according to claim 1, wherein said random output value is generated a plurality of times and said plurality of random output values are output as a random number.

14. A circuit for generating a random number comprising a plurality of circuits according to claim 1 with their outputs being arranged in parallel with each other.

15. A method for generating a random output value, comprising the steps of:
 (i) generating a predetermined voltage level and inputting said voltage level to a bistable circuit, said bistable circuit having two stable states respectively generating a 0 or a 1 as an output value and having a balanced metastable state with a floating output value between 0 and 1, said bistable circuit resolving from said metastable state to one of said stable states on being switched on, attainment of said metastable state of said bistable circuit depending on said input voltage level;
 (ii) switching said bistable circuit on;
 (iii) measuring a time taken for said bistable circuit to switch from said metastable state to one of said stable states; and
 (iv) if said time is longer than a predetermined value outputting said resolved state as said random output value;
 said method comprising performing a resetting operation comprising the following steps:
 (ia) generating a further voltage level and inputting said voltage level to said bistable circuit;
 (iia) switching said bistable circuit on;
 (iiia) measuring a time taken for said bistable circuit to switch from said metastable state to one of said stable states and switching said bistable circuit off;
 (iva) repeating said steps (iia) to (iiia) a plurality of times and determining a mean switching time;
 (va) repeating steps (ia) to (iva) a number of times for different input voltage levels; and
 (via) determining a generated voltage level providing a longest mean switching time and setting said predetermined voltage level to said determined voltage level.

16. A method according to claim 15, comprising continually performing steps (ii) to (iv) of said method to output a plurality of random output values.

17. A method according to claim 15, wherein said resetting operation is performed in response to said switching time measured in step (iv) being less than said predetermined value for a predetermined number of consecutive sequences.

18. A method according to claim 17, wherein during said resetting operation said voltage level generated is varied by a predetermined amount on each repetition performed in step (va) said voltage levels being such that said mean switching time increases at first, said repetition being performed a further number of times until said mean switching time decreases.

19. A method according to claim 17, wherein during said resetting operation said step (va) amends said voltage level to be generated in step (ia) to increase said mean switching time compared to a previous set of sequences and in response to said mean switching time exceeding said predetermined value, no further repetitions of step(va) are performed rather step (via) is performed.

20. A means for generating a random output value, comprising:
 a bistable means having two stable states in which a 0 or a 1 is output and having a balanced metastable state in which a floating value between 0 and 1 is output, for resolving from said metastable state to one of said stable states on being switched on, said state depending on a voltage level at a port on said bistable means;
 a voltage level control means for controlling a voltage level at said port on said bistable means;
 a switching time measuring means for measuring a switching time taken for said bistable circuit to switch from said metastable state to one of said stable states following switch on; and
 control means for controlling a voltage level control means, said switching time measuring means and a switching on and off of said bistable means, said control means being adapted to perform a following sequence: control said voltage level control means to set a predetermined voltage level at said port of said bistable means, switch said bistable means on, detect a measured switching time; sand if said measured switching time is longer than a predetermined value, output said resolved stable state of said bistable means as said random output value;
 wherein said control means is adapted to perform a resetting operation, said resetting operation comprising performing said sequence a plurality of times for different set voltage levels at said port or said bistable means and not outputting said resolved stable states during said resetting operation; and following said resetting operation, said control means is adapted to reset said predetermined voltage level to a voltage level value outputting a longest mean switching time during said resetting operation.

* * * * *